(12) United States Patent
Nickerson et al.

(10) Patent No.: US 8,145,591 B2
(45) Date of Patent: Mar. 27, 2012

(54) DETECTION OF HOSTILE INTENT FROM MOVEMENT PATTERNS

(75) Inventors: Jeffrey V. Nickerson, Weehawken, NJ (US); Toshihiko Matsuka, Chiba (JP)

(73) Assignee: The Trustees of The Stevens Institute of Technology, Hoboken, NJ (US)

( * ) Notice: Subject to any disclaimer, the term of this patent is extended or adjusted under 35 U.S.C. 154(b) by 834 days.

(21) Appl. No.: 12/175,855

(22) Filed: Jul. 18, 2008

(65) Prior Publication Data

US 2009/0049001 A1 Feb. 19, 2009

Related U.S. Application Data

(60) Provisional application No. 60/950,891, filed on Jul. 20, 2007.

(51) Int. Cl.
*G06F 15/00* (2006.01)
*G06F 9/44* (2006.01)
*G06K 9/18* (2006.01)

(52) U.S. Cl. ............................. 706/62; 706/52; 382/103
(58) Field of Classification Search .................... 706/62, 706/562, 52; 382/103
See application file for complete search history.

(56) References Cited

U.S. PATENT DOCUMENTS
2004/0061781 A1* 4/2004 Fennell et al. ................ 348/169

OTHER PUBLICATIONS

Merservy et al. Deception Detection through Automatic Unobstructive Analysis of Nonverbal Behiavior—2005 IEEE.*
Jiun-Yin Jian, Toshihiko Matsuka and Jeffrey V. Nickerson, "Towards Deceptive Intention: Finding Trajectories and Its Analysis" (Proceedings of the Human Factors and Ergonomics Society 50th Annual Meeting—Oct. 16-20, 2006) (pp. 324-328).
Jiun-Yin Jian, Toshihiko Matsuka and Jeffrey V. Nickerson. "Recognizing Deception in Trajectories" (Proceedings of the 28th Annual Conference of the Cognitive Science Society, Jul. 26-29, 2006) (pp. 1563-1568).

* cited by examiner

*Primary Examiner* — Jeffrey A Gaffin
*Assistant Examiner* — Ababacar Seck
(74) *Attorney, Agent, or Firm* — Greenberg Traurig, LLP (57) ABSTRACT

An embodiment of the present invention relates to a method comprising identifying a suspect; determining that the suspect has moved a first distance in a target zone around a target during a first time period; determining a suspect-target distance between the suspect and the target; determining a suspect-potential destination distance between the suspect and a potential destination in the target zone for the suspect; determining that the suspect has moved a second distance in the target zone during a second time period; determining a suspect zone around the suspect; determining a movement characteristic index associated with the suspect zone when the suspect has moved the second distance, and determining, by a computer, a probability of hostility of the suspect, wherein the probability of hostility is obtained from the movement characteristic index and a ratio of the suspect-target distance and the suspect-potential destination distance.

23 Claims, 10 Drawing Sheets

DETECTION OF HOSTILE INTENT FROM MOVEMENT PATTERNS

RELATED APPLICATIONS

This application claims the benefit of U.S. Provisional Application Ser. No. 60/950,891, filed Jul. 20, 2007, which is incorporated herein by reference in its entirety.

GOVERNMENT RIGHTS

This invention was supported in part by funds from the U.S. government ONR Grant No. N00014-05-1-00632. The U.S. government has certain rights in the invention.

BACKGROUND OF THE INVENTION

Security of a nation's people and structures is important to a nation. Technology is often employed to detect whether suspects (individuals, vehicles, or mobile objects) are or may be a hostile threat to a target, such as one or more people, structures, vehicles, etc. Current technology used to detect a suspect that is or may be hostile to a nation's people, structures, etc. typically requires that the suspect is within a close proximity to the suspect's intended target. For example, travelers or even students may have to walk through a metal detector before entering a specific area of an airport or school. By making people walk through a metal detector, the airport security or school security can help identify individuals that are carrying potentially dangerous objects.

Other hostile threat detection technology focuses on physical characteristics of a suspect to detect whether the suspect is a hostile threat. For example, technology may target a suspect's voice patterns or facial movement to determine whether the suspect is a hostile threat. Similar to requiring people to walk through a metal detector, this technology needs to be in close proximity to the suspect in order to determine whether the suspect is a hostile threat.

SUMMARY OF THE INVENTION

The present invention facilitates the determination of whether a suspect is a hostile threat to a target by analyzing the suspect's movement pattern.

In one aspect, a method comprising the steps of identifying a suspect, wherein the suspect is a mobile object or individual located in a target zone around a target; determining that the suspect has moved a first distance in the target zone during a first time period; determining a suspect-target distance, wherein the suspect-target distance is the shortest distance between the suspect and the target; determining a suspect-potential destination distance, wherein the suspect-potential destination distance is the shortest distance between the suspect and a potential destination in the target zone for the suspect; determining that the suspect has moved a second distance in the target zone during a second time period; determining a suspect zone around the suspect, wherein the suspect zone comprises a suspect zone entry point indicating the point at which the suspect entered the suspect zone; determining a movement characteristic index such as a movement inefficiency index associated with the suspect zone when the suspect has moved the second distance, wherein the movement inefficiency index is a ratio of the actual distance traveled by the suspect from the suspect zone entry point and the shortest distance between the suspect and the suspect zone entry point; and determining, by a computer, a probability of hostility of the suspect, wherein the probability of hostility is obtained from the movement characteristic index and a ratio of the suspect-target distance and the suspect-potential destination distance.

In one embodiment, there are more than one potential destination for the suspect in the target zone. As a result, in one embodiment, a plurality of suspect-potential destination distances are determined. Further, a plurality of movement characteristic indices can be calculated based on a variety of suspect zones (e.g., circles having different radii). The computer can determine the probability of hostility from the maximum movement characteristic index and the largest ratio of the suspect-target distance and each suspect-potential destination distance.

These and other advantages of the invention, will be apparent to those of ordinary skill in the art by reference to the following detailed description and the accompanying drawings.

BRIEF DESCRIPTION OF THE DRAWINGS

FIG. 8($a$) shows a three dimensional graph of empirical densities for hostile and non-hostile points in accordance with an embodiment of the present invention;

FIG. 8($b$) shows a scatter plot of the empirical densities for hostile and non-hostile points in accordance with an embodiment of the present invention;

DETAILED DESCRIPTION OF THE INVENTION

The present invention is now discussed in more detail referring to the drawings that accompany the present application. In the accompanying drawings, like and/or corresponding elements are referred to by like reference numbers.

In one embodiment of the present invention, a method to determine a probability of hostility of a suspect is provided. The method is based on the analysis of the suspect's pattern of movement. A suspect's pattern of movement may be tracked by a variety of techniques, such as by video cameras, GPS locators, laser tracking, or personal surveillance. In one embodiment, the invention can be integrated into one or more video surveillance systems.

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the present invention.

As used herein, the term "target" refers to an object, structure (e.g., fixed water infrastructure such as oil rigs, Transocean cables, piers, ferry terminals, or floating docks), food supply, water supply, a building (e.g., nuclear facility, power plant, oil refinery, military base, police station, retail store, or skyscraper), oil pipeline, transportation hub (e.g., airport, subway, or rail station), an individual, or a vehicle (e.g., airplane, helicopter, car, motorcycle, truck, or water-based vehicle such as freighter, ferry, cruise ship, or boat) that is to be protected.

As used herein, the term "suspect" is a mobile object (e.g., vehicle, airplane, helicopter, ship, etc.) and/or individual(s) located in a target zone.

As used herein, the term "target zone" refers to a zone (e.g., a circle) of any shape and size encompassing the target.

As used herein, the term "target zone entry point" refers to a point on the boundary of the target zone at which the suspect enters the target zone.

As used herein, the term "suspect-target distance" refers to the shortest distance between the suspect and the target at a given time.

As used herein, the term "suspect-potential destination distance" refers to the shortest distance between the suspect and a potential destination in the target zone for the suspect.

As used herein, the term "suspect zone" refers to a zone (e.g., a circle) of any shape and size encompassing the suspect.

As used herein, the term "suspect zone entry point" refers to a point on the boundary of the suspect zone at which the suspect entered the suspect zone.

As used herein, the term "movement characteristic index" refers to a function of the actual trajectory traveled by the suspect from the suspect zone entry point to the suspect's current location and the distance between the suspect and the suspect zone entry point. A specific instantiation of the movement characteristic index is the movement inefficiency index.

As used herein, the term "movement inefficiency index" refers to a ratio of the actual distance traveled by the suspect from the suspect zone entry point to the suspect's current location and the shortest distance between the suspect and the suspect zone entry point.

As used herein, the term "probability of hostility" refers to the probability that a suspect is going to attack, abduct, sabotage, or steal the target or something contained within the target.

As used herein, the term "experimental target" refers to a hypothetical target being protected by human subjects in the course of an experiment.

As used herein, the term "human subject" is an individual taking part in an experiment conducted to determine probabilities of hostility.

As used herein, the term "human subject target zone" refers to a zone (e.g., a circle) of any shape and size encompassing the experimental target.

As used herein, the term "human subject target zone entry point" refers to a point on the boundary of the human subject target zone at which the human subject enters the human subject target zone.

As used herein, the term "human subject-target distance" refers to the shortest travel distance between the human subject and the experimental target at a given time.

As used herein, the term "human subject-potential destination distance" refers to the shortest travel distance between the human subject and a potential destination in the human subject target zone for the human subject.

As used herein, the term "human subject suspect zone" refers to a zone (e.g., a circle) of any shape and size encompassing the human subject.

As used herein, the term "human subject suspect zone entry point" refers to a point on the boundary of the human subject suspect zone at which the human subject entered the human subject suspect zone.

As used herein, the term "human subject movement characteristic index" refers to a function of the actual trajectory traveled by the human subject from the human subject suspect zone entry point to the human subject's current location and the shortest distance between the human subject and the human subject suspect zone entry point. The human subject movement inefficiency index is one instance of the human subject movement characteristic index.

As used herein, the term "human subject movement inefficiency index" refers to a ratio of the actual distance traveled by the human subject from the human subject suspect zone entry point to the human subject's current location and the shortest distance between the human subject and the human subject suspect zone entry point.

As used herein, the term "human subject probability of hostility" refers to the probability that the human subject is going to attack, sabotage or steal the experimental target.

Figure 1:
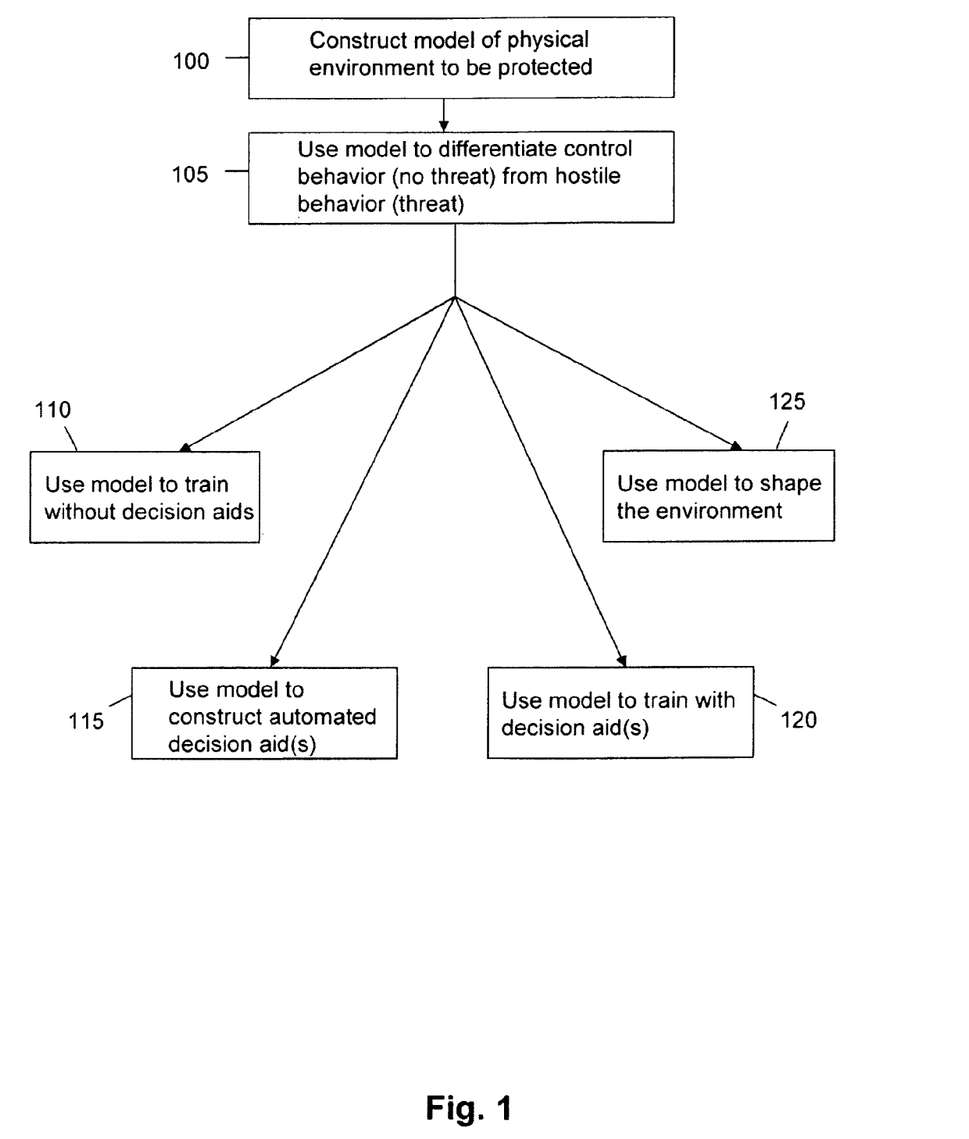
FIG. 1 is a flowchart illustrating steps performed by a computer in accordance with an embodiment of the present invention.

In one embodiment, as a broad overview and referring to FIG. 1, at least one computer constructs (e.g., using modeling software) a model of a physical environment having a target that is to be protected (step 100). The computer then uses the model, in combination with data acquired through human subject experiments, to differentiate control behavior, which is not a threat to the target, from hostile behavior, which is a threat to the target (step 105). The model can then be used for one or more practical purposes. In one example, the model can be used to train an individual in how to recognize threats to the target without decision aids (step 110). A decision aid is any information that can be used to help in the detection of a threat to a target. For example, those individuals to be trained can be exposed to numerous example scenarios and can be taught through examples to classify threats by sight.

As described in more detail below, in one embodiment, the model can also be used to construct one or more automated decision aids (step 115). In one specific embodiment, an automated decision aid classifies human subject responses into categories and builds a discrimination function. In one example, this function may be based on geometric relations between an attacker, a set of obstacles, and the target, but it may also incorporate other factors, such as speed and/or contextual information (e.g., wind or water current speed). This decision aid continuously assigns a probability of attack in relation to each target that is being guarded, while the information on the location of a suspect is provided as input to the decision aid. For different situations, this process will allow the creation of different decision aids, depending on the physical aspects of the target, as well as the characteristics of the suspect.

In one embodiment, the model can also be used to train an individual to recognize threats to a target by using a decision aid (step 120). In particular, subjects are trained in the use of a decision aid, so that they can use it to form their own conclusions about a suspect.

In one embodiment, the model is additionally used to shape the environment (step 125) that is to be protected. In particular, the introduction of obstacles or other cues in special locations can help differentiate attacking behavior from normal behavior. Simulated analysis can provide information on where to introduce these obstacles or cues. The possible cues to be used to differentiate hostile behavior may include, but are not limited to, sound cues, video-based cues (e.g., a video camera may track an individual moving through an airport and project the image briefly on a large public LCD display), and obstacles or physical hindrances that may be introduced around which suspects must move.

In one embodiment, these obstacles may be introduced as static aspects of the environment.

In one embodiment, obstacles may be introduced dynamically, so that the movement patterns around the obstacles cannot be planned ahead of time.

In one embodiment, cues may be introduced at different locations and with different characteristics, so that the reaction to a cue cannot be planned and rehearsed ahead of time.

For example, in airport environments, sound cues may be projected toward those moving in airports. These cues may involve neutral messages broadcast in particular languages or dialects, or may involve messages that have ambiguous meanings. In another embodiment, the movement patterns of people in the airport are monitored (e.g., through overhead camera(s), observation, or through tracking devices in, for example, luggage carts). In yet another embodiment, the probability of hostility is assessed through hesitations and other anomalies in the path of approach to airport security or other airport landmarks. As described in more detail below, these probabilities are empirically derived by human subject experiments.

Figure 2:
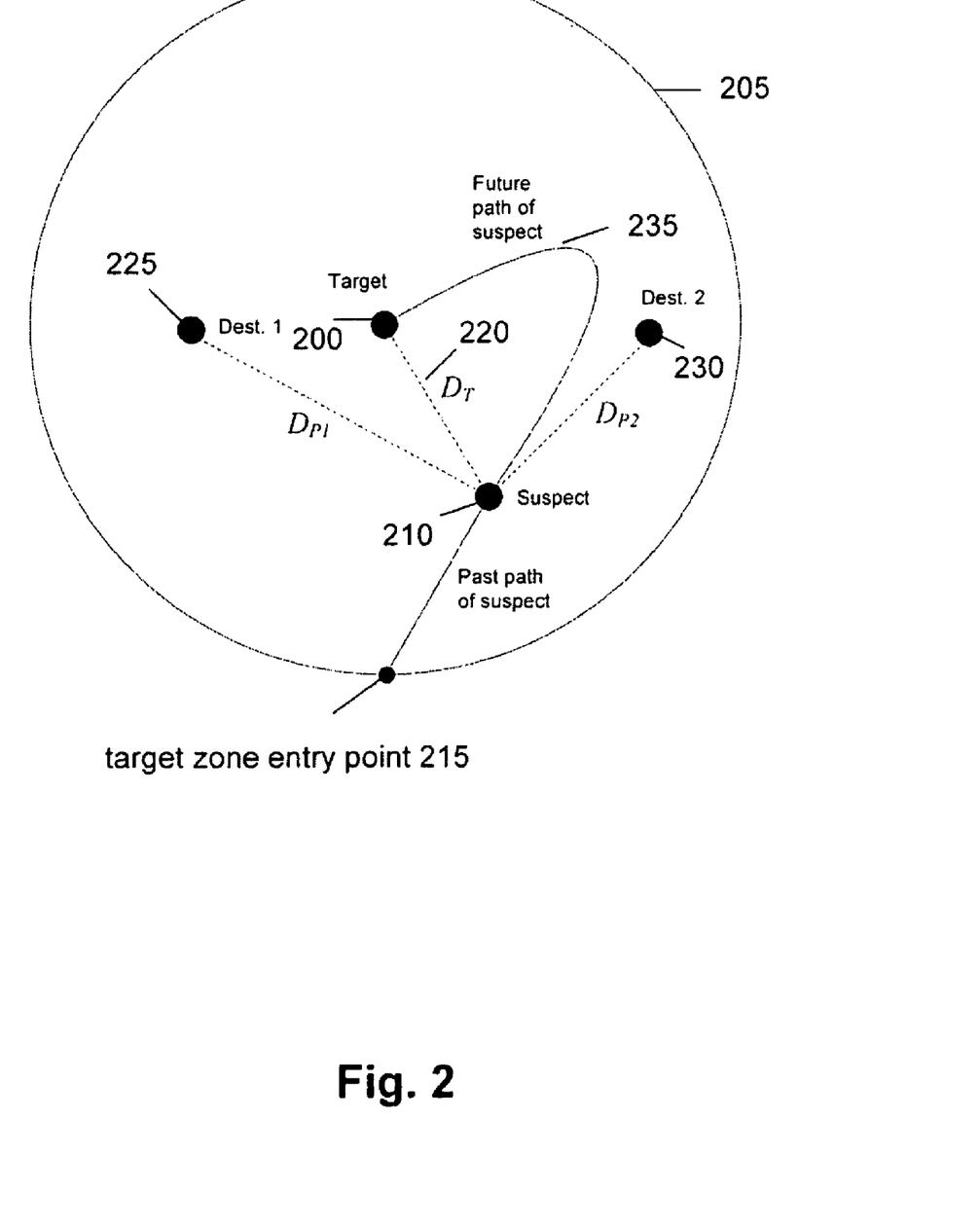
FIG. 2 is a schematic diagram of a target surrounded by a target zone and a suspect inside the target zone in accordance with an embodiment of the present invention.
Figure 3:
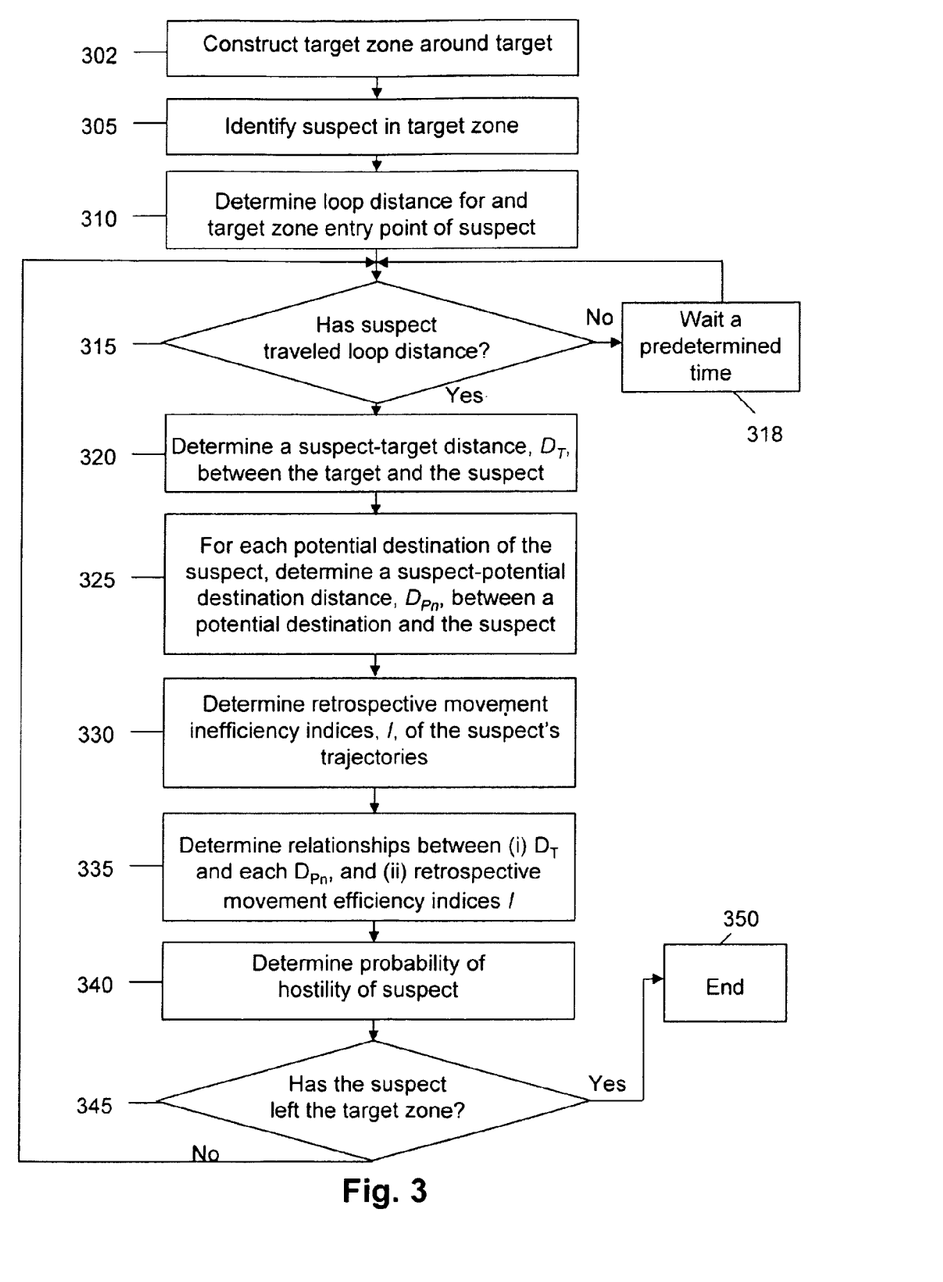
FIG. 3 shows a flowchart of the steps performed by a computer to determine a probability of hostility associated with the suspect of FIG. 2 in accordance with an embodiment of the present invention.

FIG. 2 is a schematic diagram of an embodiment of a target 200 surrounded by a target zone 205 and a suspect 210 inside the target zone 205. FIG. 3 shows a flowchart of the steps performed by a computer to determine a probability of hostility associated with the suspect 210. The computer delineates the target zone 205 around the target 200 in step 305. The target zone 205 represents the space to be protected and encompasses the target 200. The target zone 205 may be any shape and size, such as a circle with a diameter of 500 meters.

A target zone entry point 215 associated with the suspect 210 and a loop distance for the suspect 210 are determined in step 310. The target zone entry point 215 is the point at which a person or object (e.g., vehicle) entered the target zone 205 (and therefore became a suspect). The loop distance for the suspect 210 is a predetermined distance that, when traveled by the suspect 210, causes the calculations shown in step 315 through step 345 of FIG. 3 to be repeated. The computer determines whether the suspect 210 has traveled the loop distance in step 315. If not, the computer waits a predetermined (e.g., programmable) amount of time in step 318 and then returns to step 315.

If the suspect 210 has traveled the loop distance, the computer determines a suspect-target distance, $D_T$, 220 between the location of the target 200 and the current location of the suspect 210 (step 320). For example, if the target 200 is at location {0, 0}, and the suspect 210 is at location {150, −250}, the Euclidean suspect-target distance between them, $D_T$, will be approximately 292 meters ($150^2+250^2=D_T^2$; $D_T \approx 292$).

In step 325, the computer calculates a direct path suspect-potential destination distance, $D_{Pn}$, between a potential destination and the suspect 210 for each potential destination of the suspect 210. For example, in FIG. 2, a first suspect-potential destination distance $D_{P1}$ is the shortest distance from the suspect 210 to a first potential destination 225 and a second suspect-potential destination distance $D_{P2}$ is the shortest distance from the suspect 210 to a second potential destination 230. For example, if the first potential destination 225 is at location {−300, 0}, then the Euclidean Distance $D_{P1}$ will be approximately 515 meters ($450^2+250^2=D_{P1}^2$; $D_{P1} \approx 515$). If the second potential destination 230 is at {400, 0} then $D_{P2}$ will be approximately 353 meters ($250^2+250^2=D_{P2}^2$; $D_{P2} \approx 353$).

The computer then determines that the suspect 210 has moved a predetermined (e.g., programmable) distance within the target zone 205. Once this determination is made, retrospective movement inefficiency indices, I, of the suspect's trajectories with different parameter values are calculated in step 330.

Figure 4:
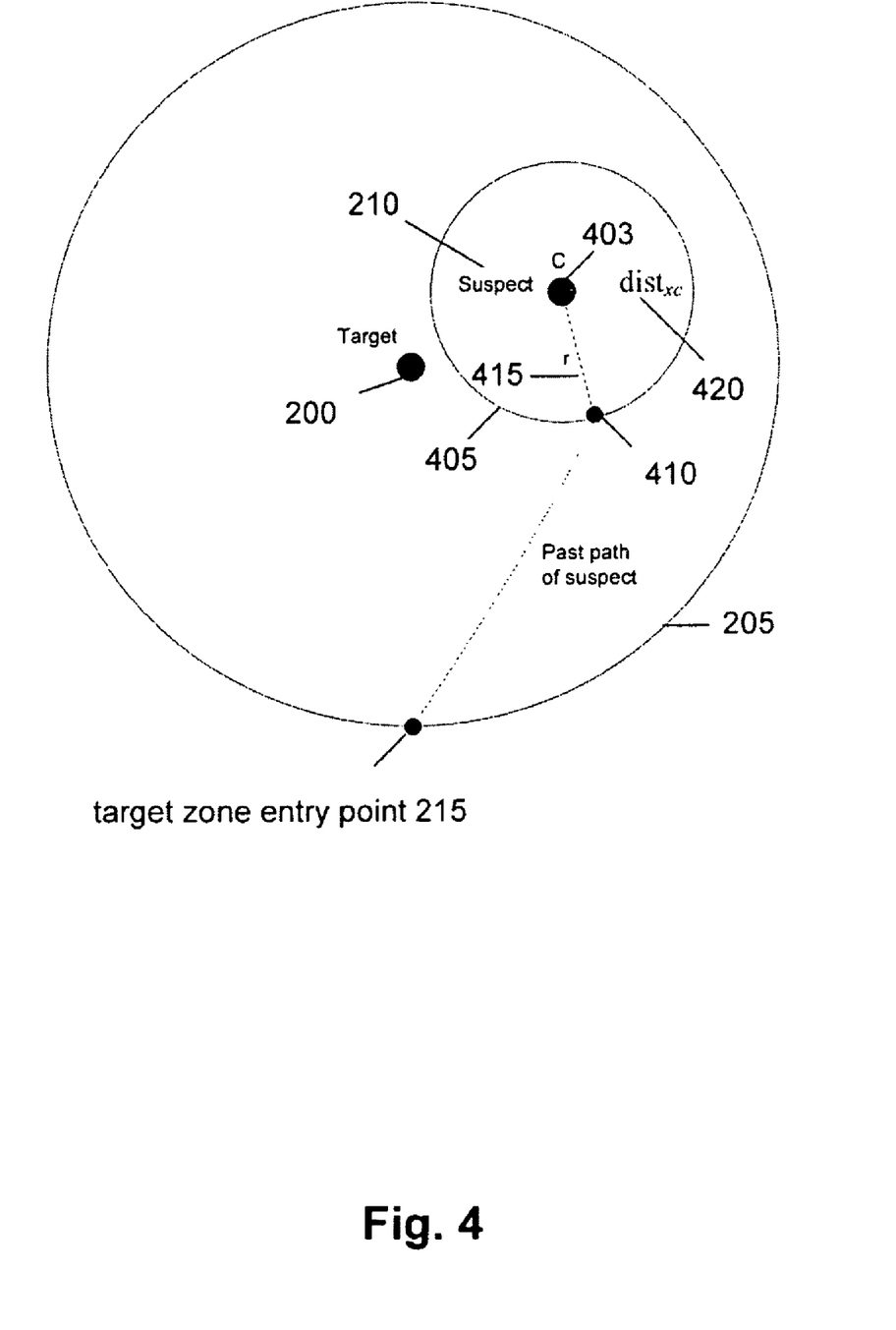
FIG. 4 is a schematic diagram of the target of FIG. 2 and the suspect of FIG. 2 surrounded by a suspect zone having a first radius in accordance with an embodiment of the present invention.

In more detail, FIG. 4 shows an embodiment of the suspect 210 at a new location C 403 (further along path 235 shown in FIG. 2). In one embodiment, the computer delineates a suspect zone 405 encompassing the suspect 210 (at the suspect's new location C 403). The suspect zone 405 can be any shaped and sized zone, such as a circle with a radius of 200 meters. The computer retrospectively locates a suspect zone entry point 410 at which the suspect's trajectory crossed into the suspect zone 405. In one embodiment, the suspect zone 405 is a circle having a predefined radius r 415. The computer determines the actual distance (i.e., $dist_{xc}$ 420) from the suspect zone entry point 410 to the location C 403 of the suspect 210. In one embodiment, the computer uses this distance ($dist_{xc}$) 420 along with the radius r 415 to calculate a movement inefficiency index $I_r$. In this embodiment, the movement inefficiency index $I_r$ is determined using the formula $dist_{xc}/r$. Radius r 415 therefore serves as a sensitively tuning parameter (e.g. a small radius r 415 can be used for sudden changes and a large radius r 415 can be used for an extended deceit scenario). In one embodiment, the computer delineates suspect zones 405 having multiple radii r. Furthermore, radii (r's) can be selected so that they are sensible to speeds and moving ranges of the suspect 210 (e.g., smaller r's 415 for humans and larger r's 415 for aircrafts).

For example, suppose that the suspect zone 405 has a radius 415 equal to 200 meters. The suspect 210 crossed the suspect zone 405 at suspect zone entry point 410. Suppose that the suspect's path from the suspect zone entry point 410 to the suspect location C 403 has been indirect, following a curved trajectory. If the distance that the suspect 210 traveled is 300 meters, then the movement inefficiency index I for the suspect's movement equals $dist_{xc}/r=300/200=3/2=1.5$.

A suspect zone 405 with a larger radius, say 250 meters, has a lower movement inefficiency index, as the path is more direct. In particular and referring now to FIG. 5, suspect zone 505 is a larger circle relative to the suspect zone 405 shown in FIG. 4. With a larger suspect zone 505, the ratio of a distance 510 traveled by the suspect 210 to the radius 515 of the suspect zone 505 is lower than the ratio calculated for the suspect zone 405 of FIG. 4. For example, suppose that the distance traveled by the suspect 210 is now 455 meters and the radius 515 of the suspect zone 505 is 350 meters, the movement inefficiency index I associated with the movement of the suspect 210 is 1.3 ($^{455}/_{350}$).

In step 335, the computer determines relationships between (i) $D_T$ and each $D_{Pn}$, and (ii) the retrospective movement inefficiency indices I. In one embodiment, the computer also determines other behavioral data associated with the target 200 and/or the suspect 210, such as the velocity of movement of the suspect 210. The computer uses these relationships and data to determine the probability of hostility associated with the suspect 210 in step 340. In one embodiment, the computer reports the probability to a user (e.g., via the computer's screen, speakers, or any output device associated with the computer).

Table 1 below shows an example.

| Largest Ratio between $D_T/D_P$ | Largest Inefficiency Index ($dist_{xc}/r$) | Probability of hostility |
|---|---|---|
| <1 | >1.4 | .99 |
| >1 | >1.4 | .98 |
| <1 | 1.1 < x < 1.4 | .75 |
| >1 | 1.1 < x < 1.4 | .61 |
| <1 | <1.1 | .01 |
| >1 | <1.1 | .01 |

The table is created through human subject experiments. For example, the first row indicates that, in past testing, a ratio of <1 between the target distance and the closest other destination, combined with an efficiency index of over 1.4, indicated a suspect was hostile 99 out of 100 times. In other words, for 100 subjects whose trials exhibited this category, 99 of them were intending to attack the target 200.

The computer calculates the first and second columns as the suspect 210 moves. In one embodiment, the probability (third column) is looked up in an internal computer hash table or database, and that probability is reported back. Note that the ratios can be expressed more finely—the table can be much larger. Also, additional columns may be added, such as speed of movement.

Figure 5:
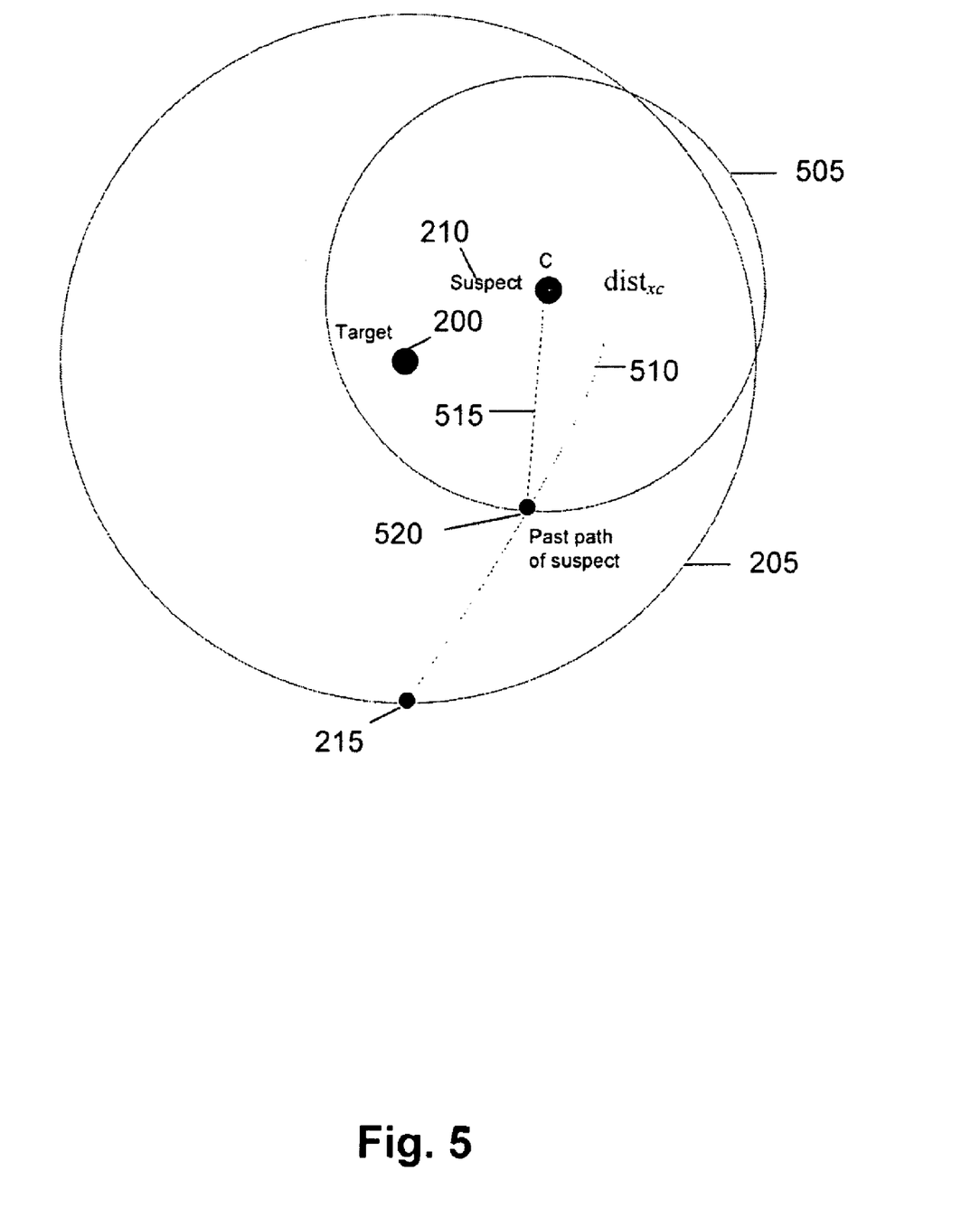
FIG. 5 is a schematic diagram of the target of FIG. 2 and the suspect of FIG. 2 surrounded by a suspect zone having a second radius in accordance with an embodiment of the present invention.

Referring now to the above example described with respect to FIGS. 2, 4, and 5, the following has been determined from the previous calculations:

$$D_T/D_{P1} \approx 292/515 \approx 0.57$$

$$D_T/D_{P2} \approx 292/353 \approx 0.82$$

$$\text{Max}[0.57, 0.82] = 0.82.$$

Therefore, the "<1" category of the left-most column of Table 1 is used.

Two inefficiency indices have been determined, 1.5 and 1.3, corresponding to two different radii lengths. Max[1.5, 1.3]=1.5, so the ">1.4" category of the second column of Table 1 is used. Therefore, the first row of Table 1 can be used to determine the probability of hostile intent of the suspect 210, and the probability is 0.99 (i.e., the probability that the suspect 210 is hostile is 99% based on the suspect's movements).

The computer then determines if the suspect 210 has left the target zone 205 in step 345. If so, then the loop ends because the suspect 210 is no longer a threat to the target (because the suspect 210 is outside of the designated area—the target zone 205). If the suspect 210 has not left the target zone 205, the computer returns to step 315.

In another embodiment, a probability of hostility of a suspect against a set of possible targets is determined. In this embodiment, the computer performs the steps shown in FIG. 3 for the entire set of possible targets. The probability of hostility is compared across the set. The computer then reports (e.g., displays) the probability of hostility and the location/name of the highest probability target.

Table 2 below illustrates an embodiment of a comparison between three targets. The determinations and calculations described above are performed, so that Table 1 can be used to determine the probability of hostility for each target. It should be noted that these probabilities will not sum to 1—they are independent. In other words, our data indicates that the probability of the suspect 210 attacking a first target is 0.1, implying the probability that the suspect 210 will not attack the first target is 0.9. The probability of the suspect attacking a second target, however, is much higher, at 0.75. The probability of the suspect 210 attacking a third target is 0.1. The probabilities for the first, second, and third targets are then compared.

| Target 1 | Target 2 | Target 3 |
|---|---|---|
| .1 | .75 | .1 |

In one embodiment, the most likely target (found by taking the maximum of the target probabilities) and its probability is displayed. The resulting display from the comparison of Table 2 is shown in Table 3 below:

| Probability of Attack | Target |
|---|---|
| .75 | 2 |

In one embodiment, the target is a retail store and the probability of hostility of a suspect represents the probability that the suspect plans on shoplifting from the retail store. Thus, in one embodiment, the owners of a retail store can employ embodiments of the present invention to detect whether someone moving within the retail store is going to take one or more items from the retail store without paying for the item(s).

Figure 6:
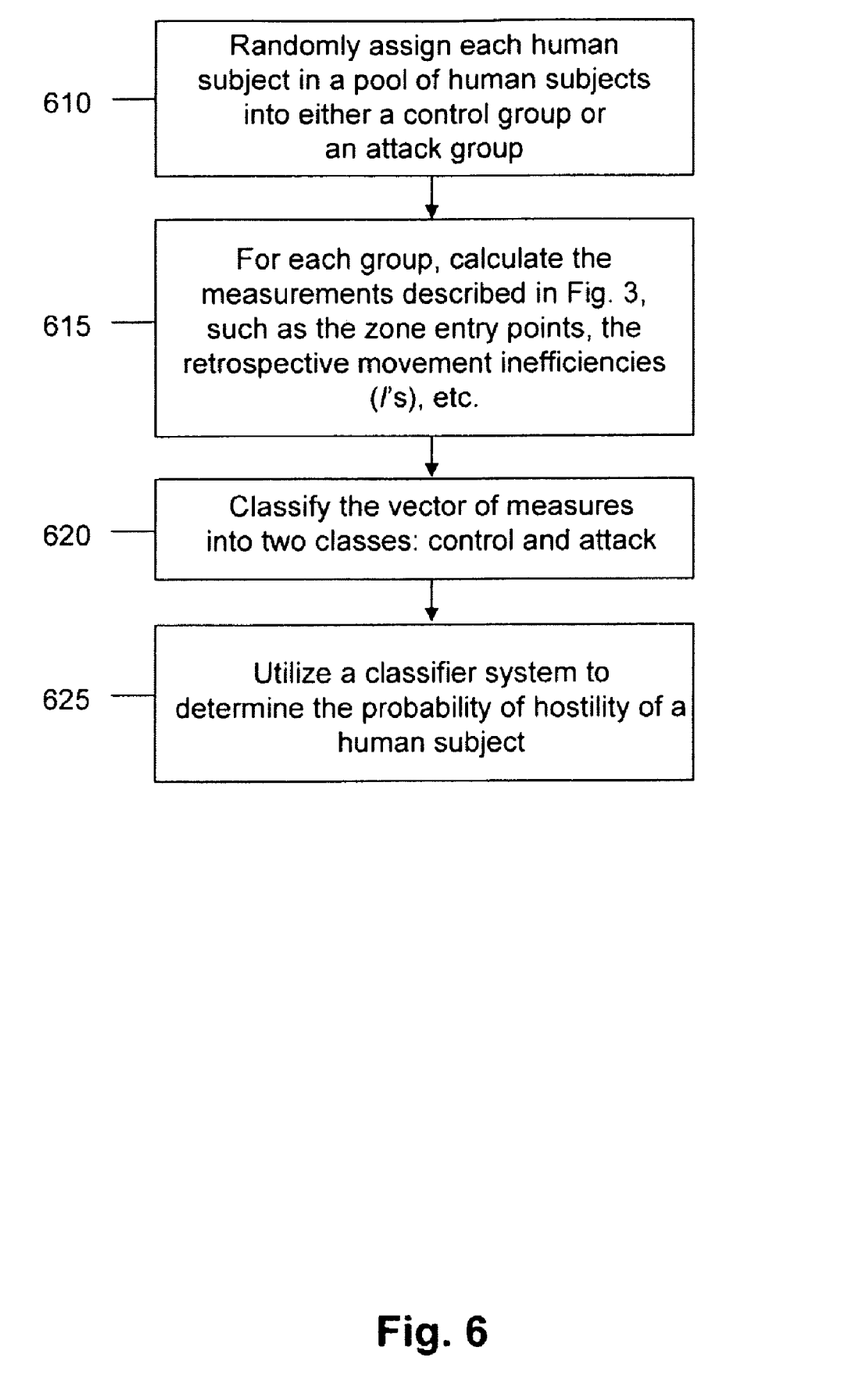
FIG. 6 shows a flowchart illustrating the steps performed by a computer to derive an empirical table of probabilities of hostility in accordance with an embodiment of the present invention.

FIG. 6 shows a flowchart illustrating the steps performed to derive an empirical table of probabilities of hostility. These steps may be executed a predetermined number of times (e.g., once) before executing the steps described above with respect to FIG. 3.

A pool of human subjects, such as a class of psychology students, is obtained. Each subject is randomly assigned into either a control group or an attack group (step 610). For example, each student is assigned a number from 1 to 100. In one embodiment, the students assigned the even numbers are designated as the control group. For each human subject, the computer calculates the measurements described with respect to FIG. 3 above, such as zone entry points for the human subjects, human subject movement inefficiency indices (I's), etc. (step 615). For example, while the subjects play a video game, the computer can determine the subjects' paths as they play the game. In step 620, the computer determines, for each human subject, a vector representing that subject's measurements. The computer classifies the vector into two classes—a control class and an attack class. For example, the assignment of the student into the hostile group or the control group is known, so the computer can use this information to separate the vectors into the control class and the attack class. In step 625, the computer utilizes a classifier system to determine the human subject probability of hostility based on the movement patterns of the human subjects. These human subject probabilities of hostility are then utilized to determine the probability of hostility of the suspect 210 based on a comparison between the measurements (described above) associated with the suspect 210 and the measurements associated with each human subject.

The classifier system can be, for example, a nearest neighbor classifier, a decision tree model, a Bayesian network, and/or a support vector machine. For example, Table 1 above illustrates a decision tree model. In another embodiment, the nearest neighbor classifier approach is used. In the nearest neighbor classifier approach, the current measures of the suspect 210 in the suspect's current location (e.g., the movement characteristic index) are obtained. The empirical data for the closest data point from past testing, at the same distance from the entry point, is searched. This is the nearest neighbor. The distance-to-nearest-neighbor is measured in an abstract space—in this case, the difference in the movement inefficiency index. The status of this neighbor is determined as being either hostile or non-hostile. The distance in the same abstract space to the nearest neighbor of the opposite category (hostile or non-hostile) is then determined. The confidence of the classification is scaled by dividing the distance to the farthest category by the distance to the closest category. Large numbers typically indicate a high degree of confidence.

Figure 7:
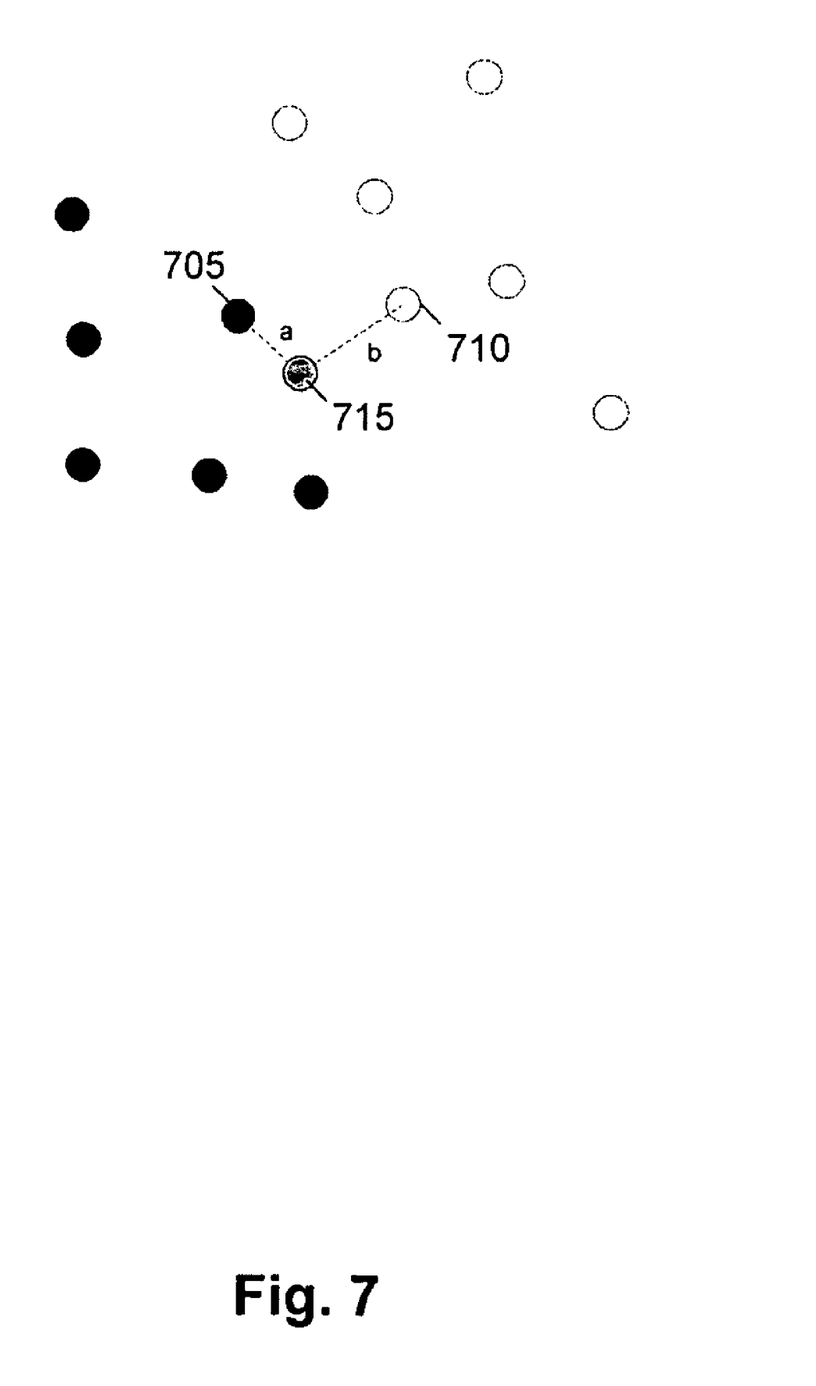
FIG. 7 is a schematic diagram of hostile points, non-hostile points, and a point to be classified by a computer in accordance with an embodiment of the present invention.

Referring to FIG. 7, black dots (e.g., dot 705) represent hostile points and white dots (e.g., dot 710) represent non-hostile points. Gray dot 715 is the point to be classified. The gray dot 715 is classified by finding the closest point—a hostile point 705. Therefore, the person corresponding to the data collected is considered hostile. The confidence is b/a: in this case, if b=100 and a=50, the confidence ratio is 100/50, or 2.

Figure 8A:
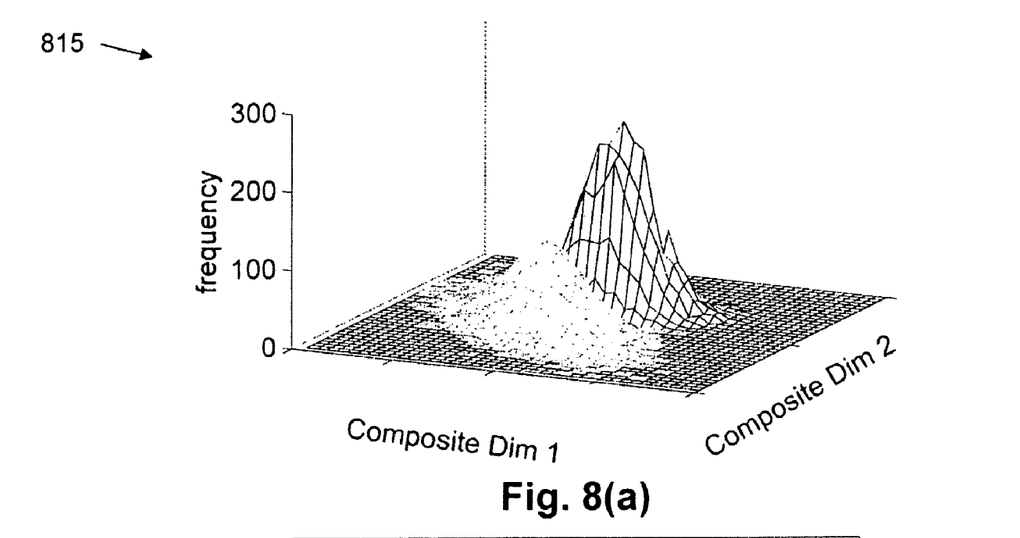
Figure 8B:
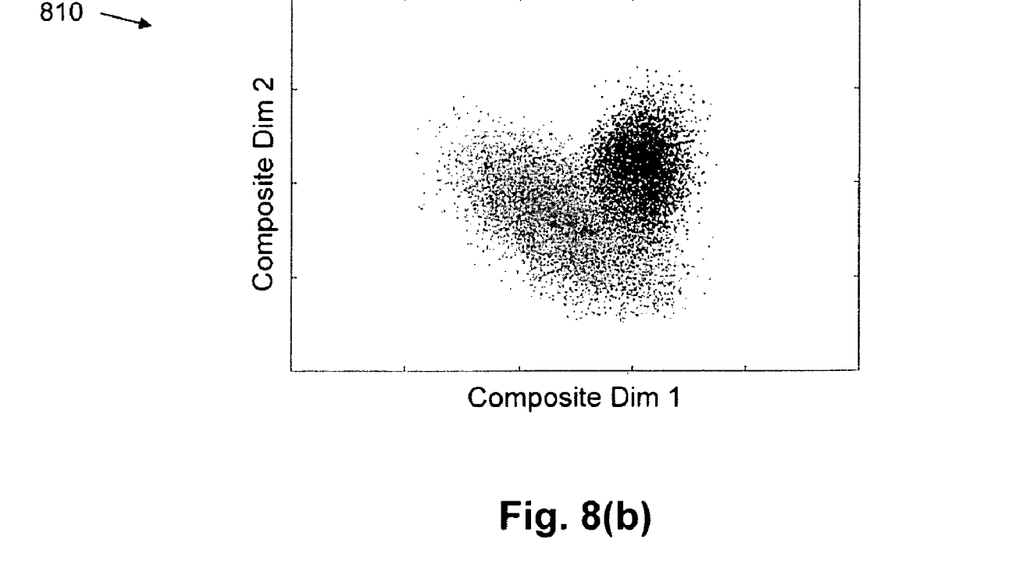

In cases where the space is large and multidimensional (different spatial dimensions, as well as speed of attack, wind speed, etc), multi-dimensional data can be projected into a smaller dimensional space, and then density estimation can be performed. For example, the data can be projected in 2-D space, and then the Z-axis can be used for the probability of hostility, as shown in FIGS. 8(a) and 8(b). Specifically, in FIG. 8(b), multidimensional data 810 from hostile and non-hostile subjects are projected into a 2D space and indicated by black and gray dots, respectively. The densities for both types are estimated based on the 2D-projected data 815 as shown in FIG. 8(a). Once the dimensionality is reduced, the data can be more readily processed using the previously described techniques (e.g., decision trees or nearest neighbor classifiers).

Alternatively, this classification can be made using support vector machines or other techniques in which a linear discriminant function is formed. The margin (the distance to the separating hyperplane) is measured. The margin may serve as a confidence of classification—the higher the margin, the more certain the classification.

Figure 9:
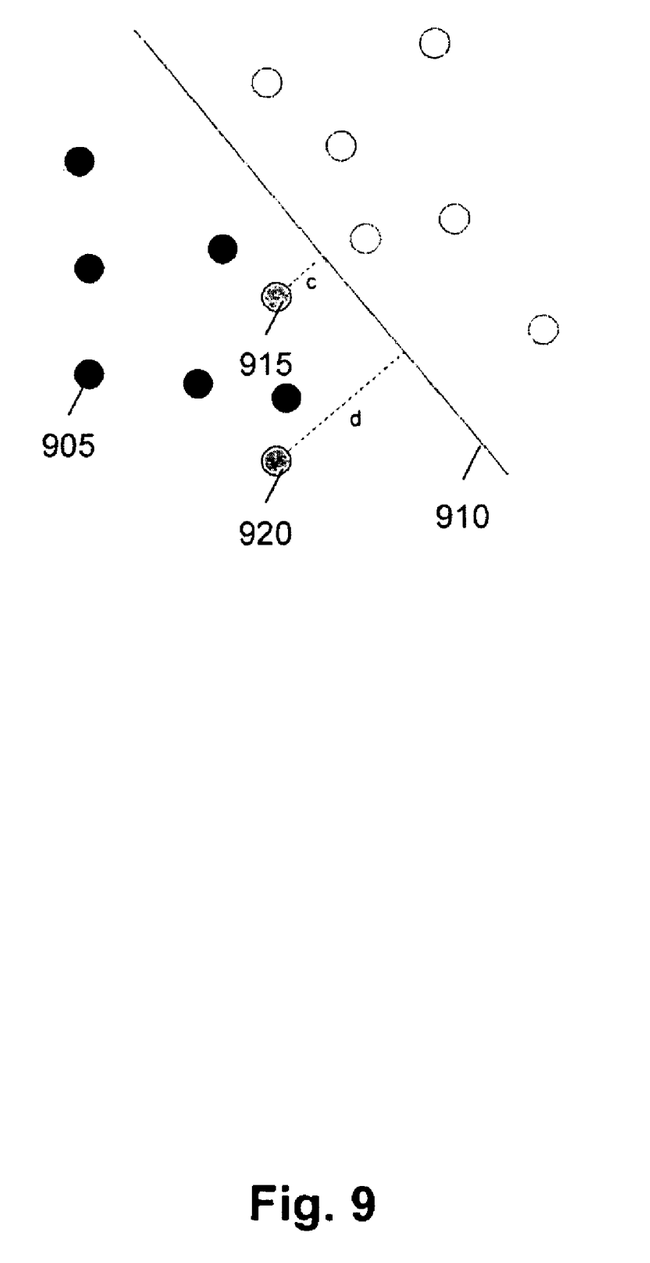
FIG. 9 is a schematic diagram of a support vector classification of hostile points and non-hostile points in accordance with an embodiment of the present invention.

A support vector classification can be used. Referring to FIG. 9, the black points (e.g., point 905) on one side of discriminant line 910 are hostile. A first gray point 915 and a second gray point 920 are points to be classified. The distance between the points and the discriminant line can indicate confidence. So if c=4 and d=10, the confidence associated with the classification of the second point 920 is higher than the confidence associated with the first point 915. The confidence of classification can, in turn, be converted to a probability of hostility using empirical data (e.g. dividing the number of correctly classified tests that scored confidence measures in a certain range by the number of tests performed). Thus, we can take Table 1, and add another column, the confidence number, and base the probabilities on the empirical data correlating the confidence number and correct prediction. The result is shown below in Table 4.

| Confidence number | Largest Ratio of between $D_T/D_P$ | Largest Inefficiency Index | Probability of hostility |
|---|---|---|---|
| <5 | <1 | >1.4 | .96 |
| <5 | >1 | >1.4 | .94 |
| >5 | <1 | 1.1 < x < 1.4 | .99 |
| >5 | >1 | 1.1 < x < 1.4 | .96 |
| <5 | <1 | <1.1 | .82 |
| <5 | >1 | <1.1 | .75 |
| >5 | <1 | >1.4 | .61 |
| >5 | >1 | >1.4 | .41 |
| <5 | <1 | 1.1 < x < 1.4 | .32 |
| <5 | >1 | 1.1 < x < 1.4 | .23 |
| >5 | <1 | <1.1 | .01 |
| >5 | >1 | <1.1 | .00 |

Note that two sets of tests should be used: one set to create the classifier, and the other to evaluate the probability of hostility using that classifier's parameters.

Figure 10:
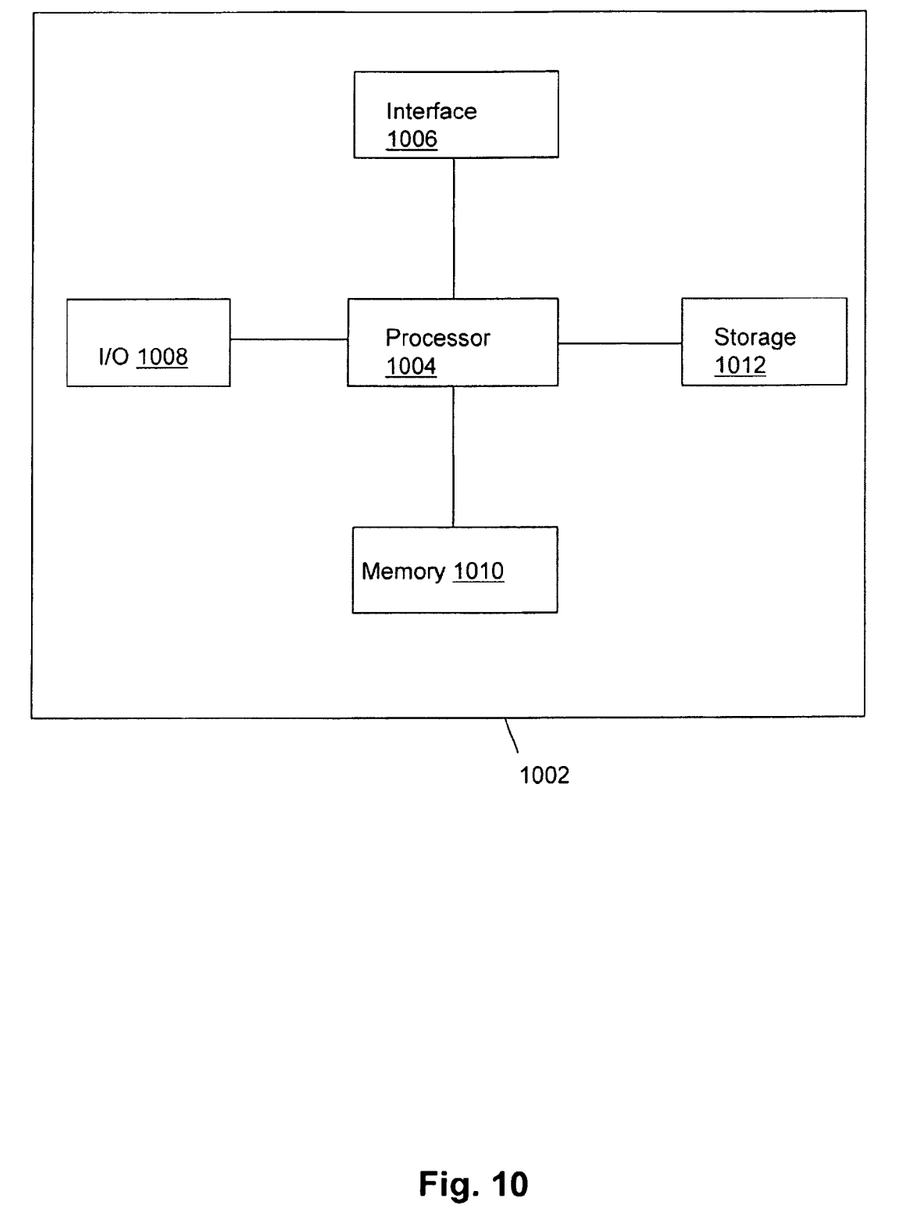
FIG. 10 is a high level block diagram of a computer in accordance with an embodiment of the present invention.

The description herewith describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 10. Computer 1002 contains a processor 1004 which controls the overall operation of computer 1002 by executing computer program instructions which define such operation. The computer program instructions may be stored in a storage device 1012 (e.g., magnetic disk) and loaded into memory 1010 when execution of the computer program instructions is desired. Computer 1002 also includes one or more interfaces 1006 for communicating with other devices (e.g., locally or via a network). Computer 1002 also includes input/output 1008 which represents devices which allow for user interaction with the computer 1002 (e.g., display, keyboard, mouse, speakers, buttons, etc.).

One skilled in the art will recognize that an implementation of an actual computer will contain other components as well, and that FIG. 10 is a high level representation of some of the components of such a computer for illustrative purposes. In addition, the processing steps described herein may also be implemented using dedicated hardware, the circuitry of which is configured specifically for implementing such processing steps. Alternatively, the processing steps may be implemented using various combinations of hardware and software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A computer-implemented method comprising:
identifying, by a computer, a suspect,
   wherein the suspect is a mobile object or an individual located in a target zone around a target;
determining, by the computer, that the suspect has moved a first distance in the target zone during a first time period;
determining, by the computer, a suspect-target distance,
   wherein the suspect-target distance is the shortest distance between the suspect and the target;
determining, by the computer, a suspect-potential destination distance,
   wherein the suspect-potential destination distance is the shortest distance between the suspect and a potential destination in the target zone for the suspect;
determining, by the computer, that the suspect has moved a second distance in the target zone during a second time period;
determining, by the computer, a suspect zone around the suspect,
   wherein the suspect zone comprises a suspect zone entry point indicating the point at which the suspect entered the suspect zone;
determining, by the computer, a movement characteristic index associated with the suspect zone when the suspect has moved the second distance,
   wherein the movement characteristic index is a function of the actual trajectory traveled by the suspect from the suspect zone entry point to the current location of the suspect and the distance between the current location of the suspect and the suspect zone entry point; and
determining, by the computer, a probability of hostility of the suspect,
   wherein the probability of hostility is obtained from the movement characteristic index and a ratio of the suspect-target distance and the suspect-potential destination distance.

2. The method of claim 1, further comprising delineating, by the computer, the target zone around the target.

3. The method of claim 1, further comprising identifying a target zone entry point of the suspect, wherein the target zone entry point is the point on the boundary of the target zone at which the suspect entered the target zone.

4. The method of claim 1, wherein more than one potential destination exists in the target zone for the suspect, resulting in a plurality of suspect-potential destination distances.

5. The method of claim 4, further comprising determining a largest ratio between the suspect-target distance and each suspect-potential destination distance in the plurality of suspect-potential destination distances.

6. The method of claim 5, further comprising determining a second suspect zone around the suspect, wherein the suspect entered the second suspect zone at a second suspect zone entry point.

7. The method of claim 6, further comprising determining a second movement characteristic index associated with the second suspect zone.

8. The method of claim 7, wherein the second movement characteristic index is a ratio of the actual distance traveled by the suspect from the second suspect zone entry point and the shortest distance between the suspect and the second suspect zone entry point.

9. The method of claim 8, further comprising determining the largest movement characteristic index between the movement characteristic index and the second movement characteristic index.

10. The method of claim 9, wherein the determining, by the computer, a probability of hostility further comprises determining the probability of hostility from the largest movement characteristic index and the largest ratio between the suspect-target distance and each suspect-potential destination distance.

11. The method of claim 1, wherein the determining, by the computer, a probability of hostility of the suspect further comprises:
identifying a group of human subjects,
   wherein a first plurality of the human subjects are in a control group and a second plurality of the human subjects are in an attack group;
identifying a target that either the first plurality or the second plurality of human subjects is going to attack;
delineating a target zone around the target and a human subject suspect zone around each human subject;
for each human subject,
   determining a human subject target zone entry point, a human subject suspect zone entry point, a human subject-target distance, at least one human subject-potential destination distance, and at least one human subject movement characteristic index; and
   determining a vector describing the movement of the human subject,
      wherein the vector is obtained from the at least one human subject movement characteristic index and a ratio of the human subject-target distance and the human subject-potential destination distance;
classifying each vector into a control class or an attack class;
determining a human subject probability of hostility for each vector, resulting in a plurality of human subject probabilities of hostility; and
identifying the probability of hostility of the suspect from the plurality of human subject probabilities of hostility.

12. The method of claim 11, further comprising determining a confidence measure associated with the classifying of the each vector into a control class or an attack class.

13. The method of claim 11, wherein the classifying each vector further comprises classifying each vector using at least one of a nearest neighbor classifier, a decision tree model, a Bayesian network, and a support vector machine.

14. The method of claim 1, wherein the determining a movement characteristic index further comprises determining a movement inefficiency index, wherein the movement inefficiency index is a ratio of the actual distance traveled by the suspect from the suspect zone entry point and the shortest distance between the suspect and the suspect zone entry point.

15. A non-transitory computer readable storage medium storing computer program instructions capable of being executed by a computer processor, the computer program instructions defining the steps of:
identifying a suspect,
   wherein the suspect is a mobile object or an individual located in a target zone around a target;
determining that the suspect has moved a first distance in the target zone during a first time period;
determining a suspect-target distance,
   wherein the suspect-target distance is the shortest distance between the suspect and the target;
determining a suspect-potential destination distance,
   wherein the suspect-potential destination distance is the shortest distance between the suspect and a potential destination in the target zone for the suspect;
determining that the suspect has moved a second distance in the target zone during a second time period;

determining a suspect zone around the suspect,
  wherein the suspect zone comprises a suspect zone entry point indicating the point at which the suspect entered the suspect zone;
determining a movement characteristic index associated with the suspect zone when the suspect has moved the second distance,
  wherein the movement characteristic index is a function of the actual trajectory traveled by the suspect from the suspect zone entry point to the current location of the suspect and the distance between the current location of the suspect and the suspect zone entry point; and
determining, by a computer, a probability of hostility of the suspect,
  wherein the probability of hostility is obtained from the movement characteristic index and a ratio of the suspect-target distance and the suspect-potential destination distance.

16. The non-transitory computer readable storage medium of claim 15, wherein more than one potential destination exists in the target zone for the suspect, resulting in a plurality of suspect-potential destination distances.

17. The non-transitory computer readable storage medium of claim 16, further comprising computer program instructions defining the step of determining a largest ratio between the suspect-target distance and each suspect-potential destination distance in the plurality of suspect-potential destination distances.

18. The non-transitory computer readable storage medium of claim 17, further comprising computer program instructions defining the step of determining a second suspect zone around the suspect, wherein the suspect entered the second suspect zone at a second suspect zone entry point.

19. The non-transitory computer readable storage medium of claim 18, further comprising computer program instructions defining the step of determining a second movement characteristic index associated with the second suspect zone.

20. The non-transitory computer readable storage medium of claim 19, wherein the second movement characteristic index is a ratio of the actual distance traveled by the suspect from the second suspect zone entry point and the shortest distance between the suspect and the second suspect zone entry point.

21. The non-transitory computer readable storage medium of claim 20, further comprising computer program instructions defining the step of determining the largest movement characteristic index from the movement characteristic index and the second movement characteristic index.

22. The non-transitory computer readable storage medium of claim 21, wherein the computer program instructions defining the step of determining a probability of hostility further comprises computer program instructions defining the step of determining the probability of hostility from the largest movement inefficiency index and the largest ratio between the suspect-target distance and each suspect-potential destination distance.

23. The non-transitory computer readable storage medium of claim 15, wherein the computer program instructions defining the step of determining a movement characteristic index further comprises computer program instructions defining the step of determining a movement inefficiency index, wherein the movement inefficiency index is a ratio of the actual distance traveled by the suspect from the suspect zone entry point and the shortest distance between the suspect and the suspect zone entry point.

* * * * *